S. M. BOWER.
TRACTION WHEEL.
APPLICATION FILED MAY 20, 1912.
1,062,382.
Patented May 20, 1913.
2 SHEETS—SHEET 1.
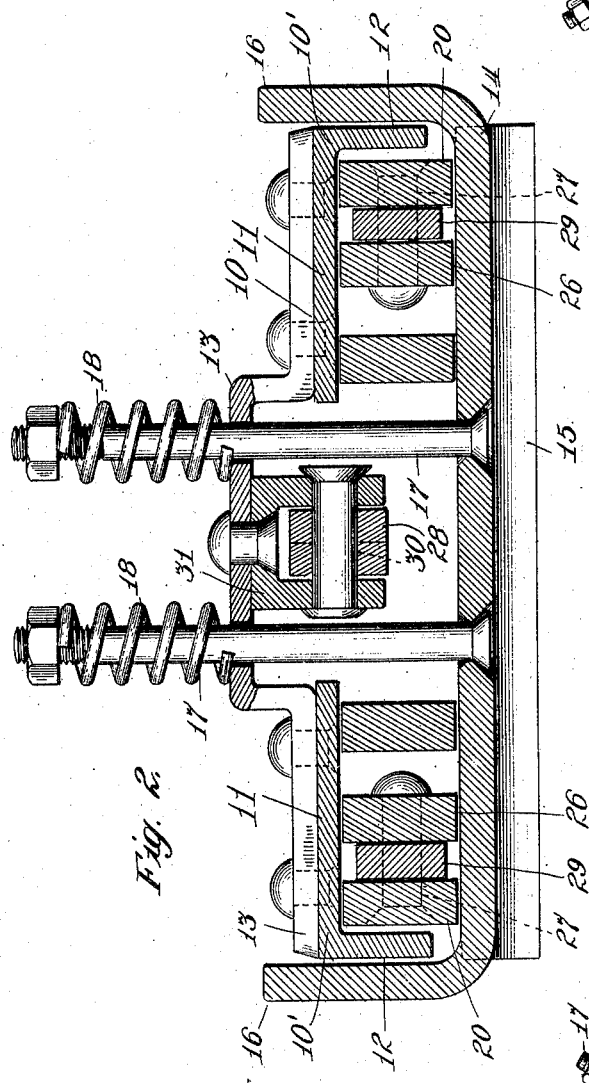
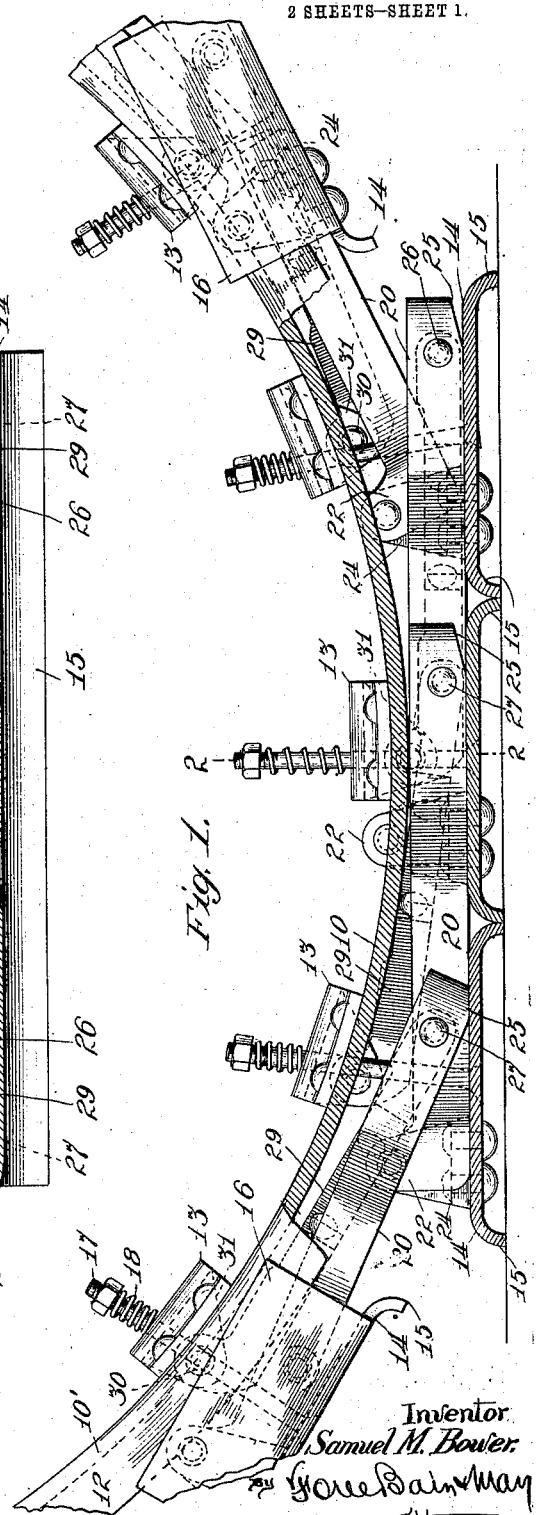
Witnesses
Milton Lenoir
E. H. Lenoir
Inventor
Samuel M. Bower
by Gore Bain May
Attorneys.

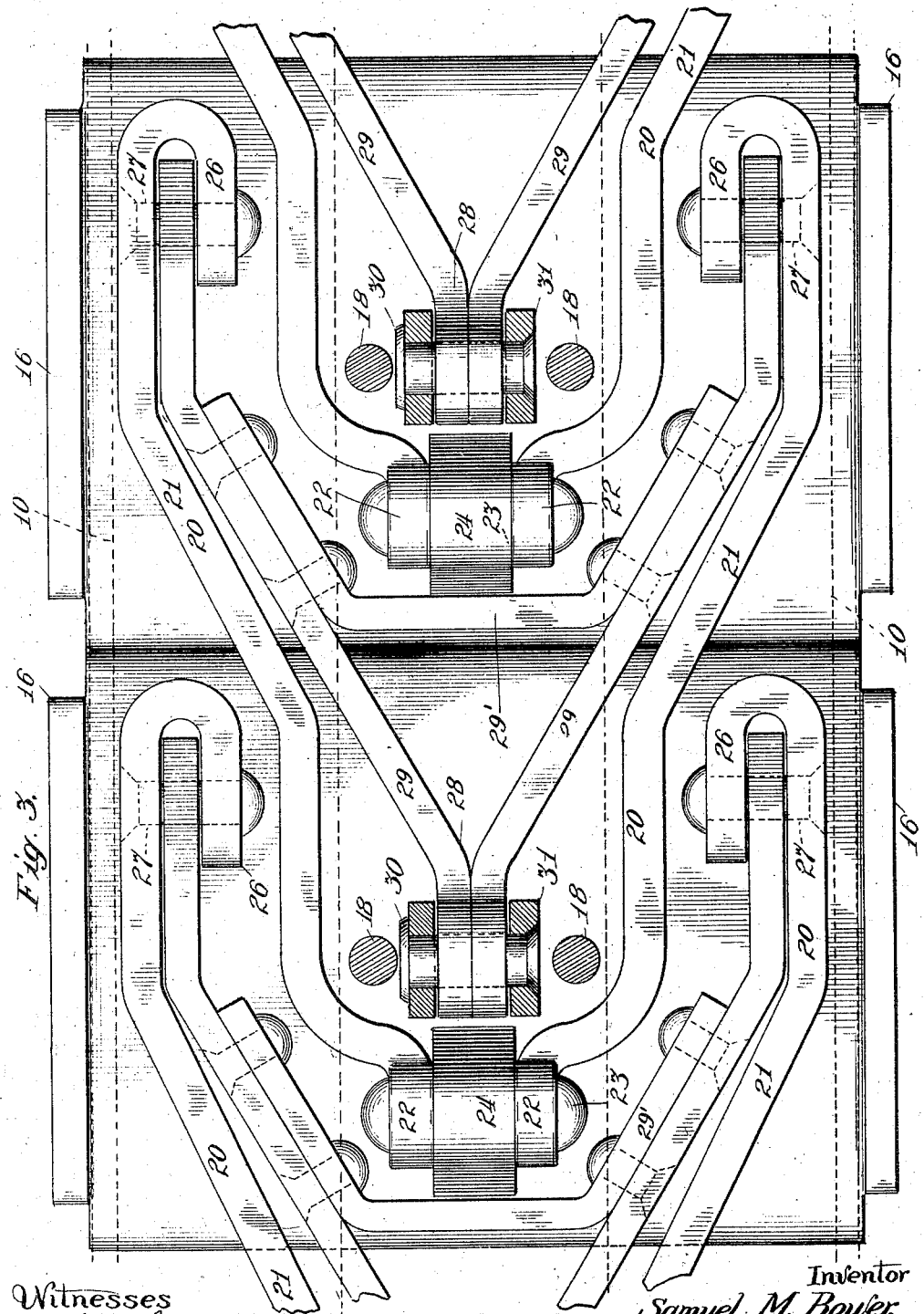

UNITED STATES PATENT OFFICE.

SAMUEL M. BOWER, OF TUTWILER, MISSISSIPPI.

TRACTION-WHEEL.

1,062,382.  Specification of Letters Patent.  Patented May 20, 1913.

Application filed May 20, 1912. Serial No. 698,421.

*To all whom it may concern:*

Be it known that I, SAMUEL M. BOWER, a citizen of the United States, residing at Tutwiler, in the county of Tallahatchie and State of Mississippi, have invented certain new and useful Improvements in Traction-Wheels, of which the following is a specification.

My invention relates to traction wheels, and particularly traction wheels of the type illustrated in my prior Patent No. 983023 dated Jan. 31, 1911, the general objects of my present invention being to provide a wheel combining simplicity, efficiency, strength, and cheapness.

In the drawings wherein I have shown an embodiment of my invention, Figure 1 is a side elevation with parts broken away showing a portion of the wheel rim and a few of the feet; Fig. 2 is a transverse section on line 2—2 of Fig. 1; and Fig. 3 is a plan view of a fragment of the wheel.

For brevity in the description I will use such terms as "above" and "below" in the sense in which they would properly apply to the parts nearest the ground.

In the drawings, 10 indicates in general a rim which may be made of any suitable construction, that shown being conveniently made of two angle-iron annuli 10', 10' each having a tread portion 11, to which the spokes (not shown) are secured and an outwardly-bent continuous flange portion 12, and said rim members being cross connected by straps 13, preferably located at the foot centers, and preferably elevated centrally above the tread parts 11.

To the rim 10 are secured feet 14, preferably of length jointly equal to the circumference of the rim tread 11, each said foot preferably having its ends bent down to form end-cleats 15, and having its side edges bent up as flanges 16 in position to lie slightly outside of the side flanges of the rim structure, thereby to prevent the foot from turning materially with respect to the rim and to form a protective side wall for the mechanism to be described. In order that the feet may be carried by the rim and given proper latitude of adaptive movements, each foot is provided with a pair of stems 17 loosely connected with its central portion and passing through suitable pertures in the straps 13 and receiving the coiled springs 18 which tend normally to hold the feet in innermost position. Obviously the feet may tilt or rock with respect to the rim, and may take a limited movement away from the rim.

Between the feet and the tread portions 11 of the rim are arranged bridge structures 20—20 preferably disposed in pairs arranged on opposite sides of the median line of the wheel. Each bridge is of a length greater than the peripheral extent of a foot, so as to span between two adjacent feet from points oppositely beyond the longitudinal centers (*i. e.* peripherally of the wheel) of the feet. The several bridges are preferably all of identical construction, each bridge having a transverse bend 21 between its ends to throw its parallel end portions out of alinement with each other thereby to enable the successive bridges to overlap, without interference, as shown in Fig. 2. The transversely inner end of each bridge member is provided with an upwardly projecting ear 22, which is pivoted as at 23 to a lug 24 carried by the foot near one transverse edge thereof, in the median line of the wheel. At its other end, the bridge has its bottom surface appropriately chamfered as at 25 and preferably inturned, as at 26, to form a yoke in which is mounted a pivot 27 for a link structure 28. Said link structure provides companion link members for both bridges of a pair, and is preferably fabricated of bars to provide links or limbs 29—29 at their outer extremities pivoted to the pivot pins 27 of the bridge-pair and converging substantially along the lines of the bends 21 in the bridges, to the median line of the wheel where both limbs 29 are connected by pivot 30 to a bracket 31 preferably in alinement with a foot center and secured to the elevated center of an appropriate cross strap 13 of the rim. For strength and rigidity the limbs 29 may be transversely braced by a truss member 29'. In the construction shown the transverse axis of pivot 30 substantially lies in the tread line of the rim members 11 and the axis of pivot 23 is a little higher from the foot than the depth of a bridge, to minimize the play to be allowed in the joints of the structure, and give the requisite freedom of foot movement.

In operation it will be apparent that the feet are carried in rotation by the rim through the stem and spring connections described and that the feet will be successively placed upon the ground, either two or three feet always contacting with the ground and affording a large bearing surface for the wheel. The wheel rim rolls upon the bridges which in turn are supported upon the feet, each bridge when placed upon two feet extending oppositely beyond the foot centers so as to prevent uptilting of the toe of a descending foot and insuring the flat presentation of the foot to the ground. As each bridge is pivotally connected at one end to a foot and at its other end is pivotally connected to a link which doubles back to a point of attachment to the rim substantially centrally above the same foot, it will be apparent that traction strains are communicated from the rim to the feet through such respective links and bridges.

While for purpose of full disclosure I have specifically described in some detail a particular embodiment of my invention specific features of which I may claim for their particular advantage, it will be apparent to those skilled in the art that my invention in its broader aspects is not limited to the specific construction shown and that many changes may be made in the embodiment thereof without departure from the spirit of my invention and within the scope of the appended claims.

What I claim is:

1. In a traction wheel the combination of a rim, feet independently mounted upon the rim for movement with respect thereto, bearing bridges interposed between the feet and rim each bridge spanning two adjacent feet, links corresponding with the respective bridges, each link being pivoted at one end to a corresponding bridge end, and the opposite extremities of the bridge and link being respectively pivoted to a foot and to the rim above said foot.

2. In a traction wheel, the combination of a rim, feet independently mounted upon the rim for movement with respect thereto, bearing bridges interposed between the feet and rim each bridge spanning two adjacent feet, links corresponding with the respective bridges, each link being pivoted at one end to a corresponding bridge, and the opposite extremities of the bridge and link being respectively pivoted to a foot and to the rim above said foot, the axis of pivotal connection between said foot and bridge being near the bearing surface of the bridge, and the axis of pivotal connection between the link and rim being near the bearing plane of the rim.

3. In a traction wheel the combination of a rim having outwardly extending flanges, feet carried by the rim, each having inwardly extending side flanges substantially interfitting with the side flanges of the rim, and lying exteriorly thereto, bridges interposed between the feet and rim, and means for communicating traction strain from said rim to said feet through said bridges.

4. In a traction wheel, the combination of a rim, feet independently mounted on the rim to be carried in rotation thereby, bridge members between the feet and rim, each said bridge member spanning between points on adjacent feet oppositely beyond the longitudinal center of said feet, and at one end pivotally connected with one of said feet, link members for the bridges connecting the free end of each bridge with a point on the rim above the foot to which the bridge member is pivotally connected, and side flanges on the feet embracing the sides of the rim.

5. In a traction wheel, the combination of a rim, feet independently mounted on the rim to be carried in rotation thereby, bearing bridges interposed between the feet and rim, each bridge having end portions out of alinement with the end portions of adjacent bridges for overlapping arrangement of all the bridges and each bridge extending beyond the longitudinal centers of the underlying feet spanned thereby, and links corresponding with the respective bridges, each link being pivoted at one end to a bridge, and the opposite extremities of the bridge and link being pivoted respectively to a foot and to the rim above said foot.

6. In a traction wheel, the combination of a rim, feet independently mounted on the rim to be carried in rotation thereby, bearing bridges pivoted to each foot near the median line and beyond the longitudinal center thereof, and extending divergently over said foot to points on the adjacent foot beyond its longitudinal center, and links for said bridges, the links for each pair of bridges pivoted to said bridges at their free ends and converging toward the center of the foot to which said pair of bridges are pivoted, said links being pivoted to the rim adjacent the center of said foot to which said pair of bridges are pivoted.

7. In a traction wheel, the combination of a rim, feet independently mounted on the rim to be carried in rotation thereby, and a plurality of bridges and links suitably pivoted between said feet and rim, said bridges being arranged in converging overlapping pairs, and said links being arranged in converging overlapping pairs each within the corresponding pair of bridges.

In testimony whereof I hereunto set my hand in the presence of two witnesses.

SAMUEL M. BOWER.

In the presence of—
R. P. TURNER,
S. D. HAMILTON.